United States Patent
Connolly et al.

(10) Patent No.: US 8,305,192 B2
(45) Date of Patent: Nov. 6, 2012

(54) RFID READER WITH AUTOMATIC NEAR/FAR FIELD INTERROGATION MODE SWITCHING, AND RELATED OPERATING METHODS

(75) Inventors: Sean Connolly, Stony Brook, NY (US); Mark Duron, East Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 863 days.

(21) Appl. No.: 12/275,892

(22) Filed: Nov. 21, 2008

(65) Prior Publication Data

US 2010/0127828 A1    May 27, 2010

(51) Int. Cl.
*H04Q 5/22*    (2006.01)
(52) U.S. Cl. .................. 340/10.1; 340/10.41; 235/462.2
(58) Field of Classification Search .................. 340/10.1, 340/10.41; 235/462.2
See application file for complete search history.

(56) References Cited

U.S. PATENT DOCUMENTS

| | | | |
|---|---|---|---|
| 5,382,784 A * | 1/1995 | Eberhardt ................. | 235/462.46 |
| 6,179,206 B1 * | 1/2001 | Matsumori ................. | 235/383 |
| 6,286,762 B1 * | 9/2001 | Reynolds et al. ......... | 235/472.01 |
| 7,055,750 B2 * | 6/2006 | Carrender ................. | 235/472.01 |
| 7,114,655 B2 * | 10/2006 | Chapman et al. ......... | 235/462.01 |
| 7,154,283 B1 * | 12/2006 | Weakley et al. .......... | 324/756.01 |
| 7,175,093 B2 * | 2/2007 | Bridgelall ................. | 235/472.01 |
| 7,180,421 B2 * | 2/2007 | Pahlaven et al. ........... | 340/572.1 |
| 7,271,576 B1 * | 9/2007 | O'Harra, II ................. | 324/76.19 |
| 7,298,264 B1 * | 11/2007 | Kuzma et al. ............... | 340/572.1 |
| 7,387,241 B2 * | 6/2008 | Hassenbuerger ............. | 235/383 |
| 7,392,951 B2 * | 7/2008 | Ray et al. .................. | 235/462.2 |
| 7,576,657 B2 * | 8/2009 | Duron et al. ............... | 340/572.7 |
| 7,688,307 B1 * | 3/2010 | Tsyrganovich ............... | 345/158 |
| 7,768,392 B1 * | 8/2010 | Brand et al. ............... | 340/539.13 |
| 7,772,964 B2 * | 8/2010 | Tethrake et al. ............ | 340/10.51 |
| 7,787,239 B2 * | 8/2010 | Mangaroo et al. ......... | 361/679.01 |
| 7,983,779 B2 * | 7/2011 | Kotula ......................... | 700/110 |
| 8,096,475 B2 * | 1/2012 | Perera et al. .................. | 235/454 |
| 8,152,071 B2 * | 4/2012 | Doherty et al. ........... | 235/472.01 |
| 2003/0114898 A1 | 6/2003 | Von Arx | |
| 2004/0118920 A1 * | 6/2004 | He ................................ | 235/454 |
| 2004/0134341 A1 * | 7/2004 | Sandoz et al. ............... | 89/41.09 |
| 2005/0103857 A1 * | 5/2005 | Zhu et al. ................... | 235/462.22 |
| 2006/0208086 A1 * | 9/2006 | Rudeen et al. ............. | 235/472.01 |
| 2007/0008120 A1 * | 1/2007 | Smith et al. ............... | 340/539.26 |
| 2007/0008140 A1 | 1/2007 | Saarisalo | |
| 2008/0023552 A1 * | 1/2008 | Gillet et al. ............... | 235/462.36 |

(Continued)

OTHER PUBLICATIONS

PCT International Search Report Dated Apr. 23, 2010.

(Continued)

*Primary Examiner* — Albert Wong
*Assistant Examiner* — Rufus Point
(74) *Attorney, Agent, or Firm* — Bartholomew DiVita; Terri Hughes Smith; Kenneth A. Haas

(57) ABSTRACT

A dual-mode RFID reader is capable of automatically switching from a far-field interrogation mode to a near-field interrogation mode upon the detection of certain operating or handling conditions. The RFID reader includes an RFID radio module configured to support a far-field interrogation mode and a near-field interrogation mode, an antenna arrangement coupled to the RFID radio module, and a mode-switch sensor architecture coupled to the RFID radio module. The mode-switch sensor architecture is configured to detect conditions indicative of near-field interrogation, and the RFID radio module automatically configures itself for operation in the near-field interrogation mode upon detection of such conditions.

3 Claims, 6 Drawing Sheets

U.S. PATENT DOCUMENTS

| | | |
|---|---|---|
| 2008/0081608 A1 | 4/2008 | Findikli |
| 2008/0185432 A1* | 8/2008 | Caballero et al. ............. 235/435 |
| 2008/0238621 A1* | 10/2008 | Rofougaran et al. ........ 340/10.1 |
| 2009/0066509 A1* | 3/2009 | Jernstrom et al. .......... 340/568.1 |
| 2009/0102663 A1* | 4/2009 | Hillegass ................... 340/572.5 |
| 2009/0200378 A1* | 8/2009 | Doherty et al. .......... 235/462.01 |
| 2010/0087145 A1* | 4/2010 | Ikeda ........................... 455/41.2 |
| 2010/0127828 A1* | 5/2010 | Connolly et al. ............ 340/10.1 |
| 2010/0161955 A1* | 6/2010 | Helfenbein et al. .......... 713/100 |
| 2010/0174759 A1* | 7/2010 | Piccinini et al. .............. 707/805 |

OTHER PUBLICATIONS

International Preliminary Report on Patentability and Written Opinion for International Application No. PCT/US2009/062915 dated May 24, 2011.

* cited by examiner

US 8,305,192 B2

RFID READER WITH AUTOMATIC NEAR/FAR FIELD INTERROGATION MODE SWITCHING, AND RELATED OPERATING METHODS

TECHNICAL FIELD

Embodiments of the subject matter described herein relate generally to radio frequency identification (RFID) systems. More particularly, embodiments of the subject matter relate to an RFID reader that can automatically change its interrogation mode from a far-field operating mode to a near-field (contact) operating mode.

BACKGROUND

RFID systems, RFID tags, and RFID readers are well known, and they are utilized in many different applications such as inventory control, shipping, asset tracking, vehicle toll booths, and point-of-purchase. An RFID reader interrogates RFID tags, which provide tag data that can be collected, interpreted, displayed, or otherwise processed by the RFID reader or other elements of the RFID system. In practice, UHF RFID readers have a read zone or volume of space that can sometimes be difficult to control due to multipath effects or reflections of the RF signal that extend the range of an RFID reader over what is expected in an otherwise free space environment.

At times it is necessary to isolate an RFID tag physically in order to distinguish it from a larger population of tags. Examples of where this situation occurs are in retail point of sale, baggage handling, or any application where it is necessary to reliably identify an RFID-tagged item from a large group of tagged items using UHF RFID readers. Spatial isolation of an RFID tag may be difficult if the interrogation range of the RFID reader is not easily controlled or adjusted to a lower power setting. Problems that occur with conventional RFID readers include reading RFID tags that are not in the desired field of view or that are located at adjacent reader locations. This can lead to errors in customer purchases or errors in verification that an item is in a specific physical location (e.g., baggage on a specific cart).

In an effort to reduce the problems outlined above, some RFID readers may be capable of changing from a far-field reader to a near-field or contact reader. In practice, the ability to quickly and easily change the read zone of an RFID reader is essential for applications where the user will be challenged to isolate items within a large group and perform a read, write, or kill function on the RFID tag associated with the isolated item. However, conventional dual-mode RFID readers typically require complicated, lengthy, or cumbersome manipulation to switch between far-field and near-field modes. For example, it may be necessary to access and manipulate a number of different user interface features such as graphical menus, buttons, and confirmation screens before the RFID reader can function in the near-field mode.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Figure 2:
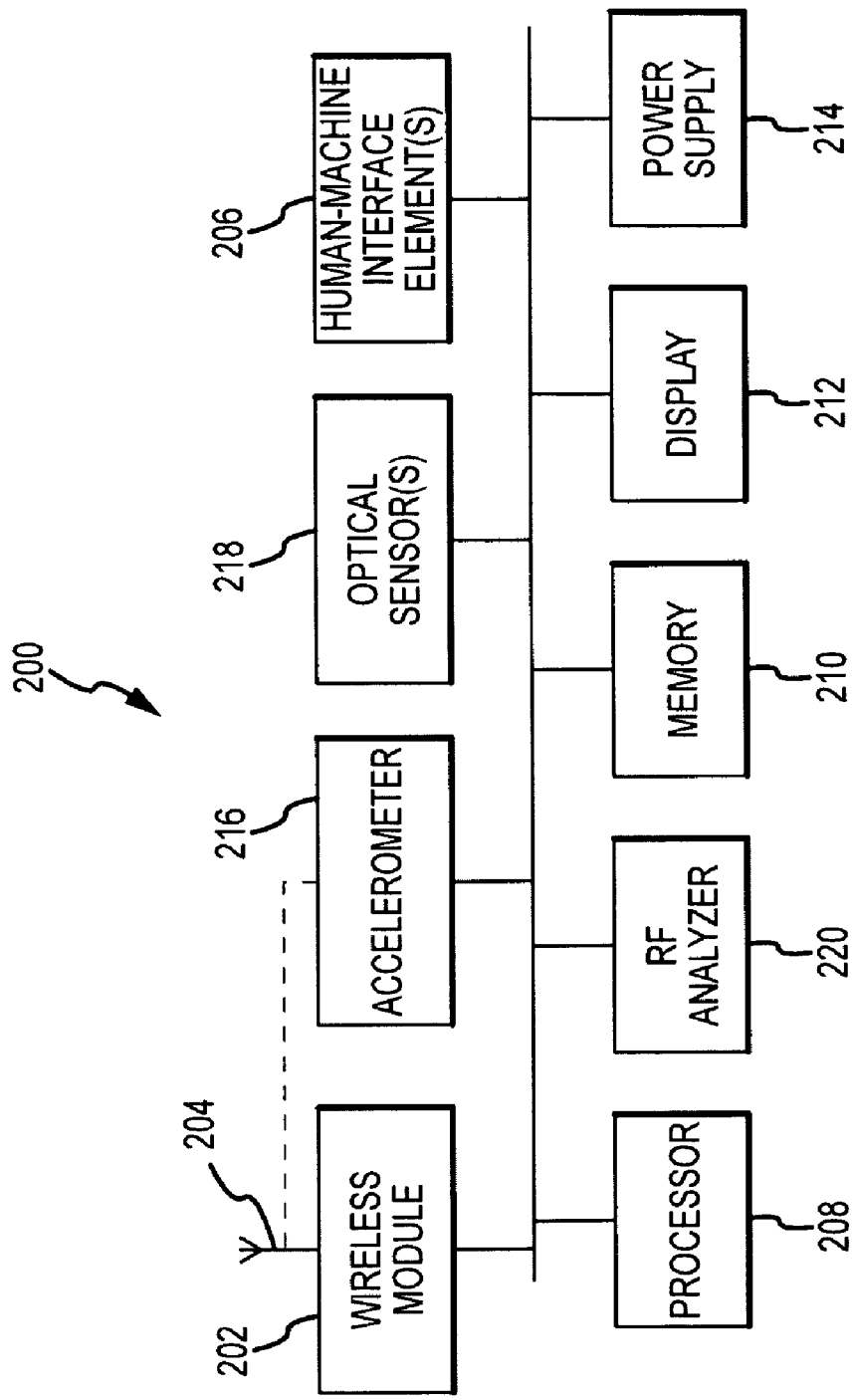
FIG. 2 is a schematic representation of an RFID reader that supports automatic near-field mode switching.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

An RFID reader as described herein can function in at least two different interrogation modes—a far-field mode and a near-field mode. While operating in the far-field interrogation mode, the RFID reader is capable of concurrently interrogating a plurality of RFID tags within a relatively large RF range. Conversely, while operating in the near-field interrogation mode, the RFID reader can selectively and individually interrogate one RFID at a time. Notably, the RFID reader can switch from the far-field mode to the near-field mode quickly and easily with little or no user involvement. Indeed, certain embodiments of the RFID reader automatically change to the near-field mode upon detection of one or more conditions that are indicative of a near-field interrogation environment.

Figure 1:
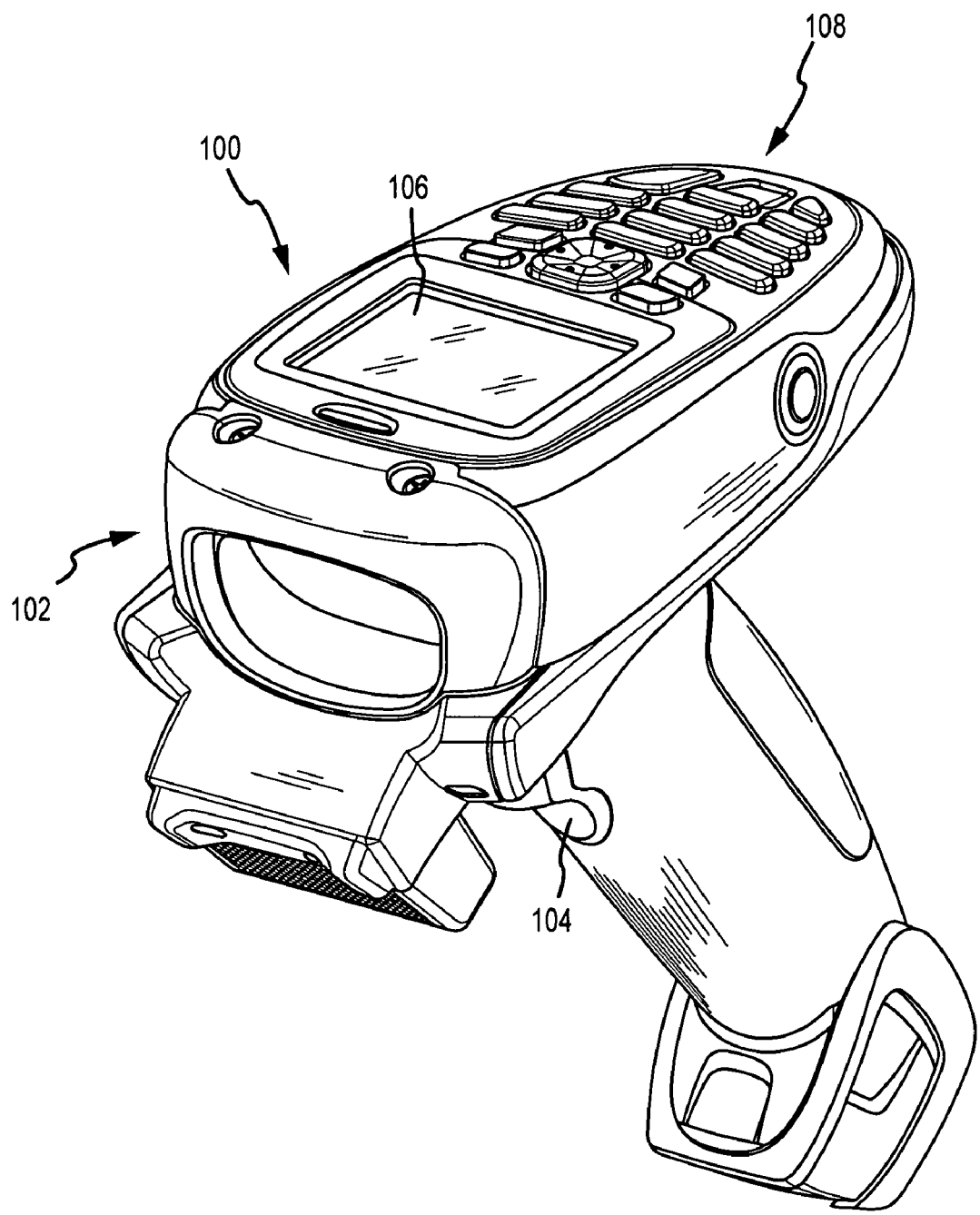
FIG. 1 is a perspective view of an exemplary mobile RFID reader that supports automatic near-field mode switching.

FIG. 1 is a perspective view of an exemplary mobile RFID reader 100 that supports automatic near-field mode switching as described herein. In practice, the techniques and operations described herein can be deployed in any number of RFID reader configurations, and the embodiment depicted in FIG. 1 is merely one exemplary implementation. For the sake of brevity, conventional techniques related to RFID data transmission, RFID system architectures, RF antenna design, signal processing, and other functional aspects of the systems (and the individual operating components of the systems) may not be described in detail herein. In addition, although the following description focuses on various mobile, handheld, or portable RFID reader implementations, the subject matter is not so limited. In other words, some of the techniques and functionality described herein could also be ported for use with fixed RFID readers and/or other non-mobile versions.

RFID reader 100 is a relatively small and compact handheld device that can be operated to interrogate RFID tags within its selected interrogation range. RFID reader 100 generally includes, without limitation: an antenna arrangement 102; a trigger mechanism 104; a display element 106; and a keypad 108. RFID reader 100 utilizes antenna arrangement 102 and an RFID radio module (not shown) to transmit RFID interrogation signals, and to receive response signals generated by RFID tags. Antenna arrangement 102 and the RFID radio module may also be suitably configured to read signals transmitted by active RFID tags. This particular embodiment of RFID reader 100 is gun-shaped, and it uses a front-mounted antenna arrangement 102 that is naturally pointed toward the intended target during normal handheld operation of RFID reader 100. In this regard, RFID reader 100 may include a mechanical trigger mechanism 104 (e.g., a switch, a button, a lever, or a finger trigger as shown) that can be manipulated by the user to generate interrogation signals, to receive and process RF signals generated by active RFID tags, and/or to initiate the transition between interrogation modes. Alternatively or additionally, RFID reader 100 could employ other human-machine interface elements, including, without limitation: a microphone and voice command processor; a touch screen, which may be incorporated into display element 106; a touchpad; an optical sensor; a motion sensor, such as an accelerometer; a graphical pointing device, such as a joystick or trackball; or the like.

FIG. 2 is a schematic representation of an RFID reader 200 that supports automatic near-field mode switching. Indeed, RFID reader 100 may incorporate the elements, features, and functions of RFID reader 200. It should be apparent that FIG. 2 depicts RFID reader 200 in a very simplified manner, and a practical embodiment will of course include many additional features and components. RFID reader 200 generally includes, without limitation: an RFID radio module 202; an antenna arrangement having at least one antenna element 204 coupled to RFID radio module 202; one or more human-machine interface elements 206; a processor 208; an appropriate amount of memory 210; a display element 212; and a power supply 214. Depending upon the particular embodiment, RFID reader 200 may include an accelerometer 216, one or more optical sensors 218, and/or an RF analyzer 220. The various operating elements of RFID reader 200 are coupled together as needed to facilitate the delivery of operating power from power supply 214, the transfer of data, the transfer of control signals and commands, and the like.

RFID radio module 202 and the antenna arrangement are suitably configured to support RFID interrogation and RFID tag reading functions of RFID reader 200. In particular, RFID radio module 202 and the antenna arrangement are configured to support both a far-field interrogation mode and a near-field interrogation mode as needed during operation of RFID reader 200. RFID radio module 202 can receive and process RF signals associated with the operation of RFID reader 200, and to otherwise support the RFID functions of RFID reader 200. In this regard, RFID radio module 202 may include a transceiver or radio element that generates RFID interrogation signals and receives reflected RFID signals generated by RFID tags in response to the interrogation signals. RFID radio module 202 also functions to generate the RF drive signals for antenna element 204. In the exemplary embodiment described herein, RFID radio module 202 is designed to operate in the UHF frequency band designated for RFID systems. For example, in the United States, RFID systems may utilize the 902-928 MHz frequency band, and in Europe, RFID systems may utilize the 865-868 MHz frequency band. Notably, antenna element 204 can be designed, configured, and tuned to accommodate the particular operating frequency band of the host RFID reader.

Antenna element 204 is suitably configured to transmit and receive RF energy associated with the operation of RFID reader 200. Accordingly, antenna element 204 can be coupled to RFID radio module 202 using appropriate RF transmission lines or cables. Referring again to FIG. 1, antenna arrangement 102 may include a protective housing or case for antenna element 204. Moreover, antenna arrangement 102 may include or be coupled to accelerometer 216 (described in more detail below).

Human-machine interface elements 206 and display element 212 function as input/output elements for the operator of RFID reader 200. Thus, human-machine interface elements 206 and display element 212 can be used as necessary to support input/output functions in a conventional manner. In certain embodiments, human-machine interface elements 206 can be used to receive a user-initiated interrogation trigger that, in turn, initiates an automatic reconfiguration routine such that RFID reader 200 readies itself for operation in the near-field interrogation mode. Human-machine interface elements 206 can be any component, device, subsystem, or element that can react to user manipulation or some form of user input. For example, human-machine interface elements 206 may include, without limitation: a trigger mechanism; a switch; a button; a lever; a microphone; a voice command processor; a touch screen; a touchpad; a keyboard; an optical or image sensor; an infrared sensor; a graphical pointing device; an accelerometer; a motion sensor; etc. It should be appreciated that some embodiments of RFID reader 200 need not include display element 212 and/or human-machine interface elements 206.

Processor 208 may be any general purpose microprocessor, controller, or microcontroller that is suitably configured to control the operation of RFID reader 200. In practice, processor 208 may execute one or more software applications that provide the desired functionality for RFID reader 200. In this regard, processor 208 can control, manage, and regulate operation of RFID reader 200 in different interrogation modes and handle the switching between the different interrogation modes.

Memory 210 may be realized as any processor-readable medium, including an electronic circuit, a semiconductor memory device, a ROM, a flash memory, an erasable ROM, a floppy diskette, a CD-ROM, an optical disk, a hard disk, an organic memory element, or the like. For example, memory 210 is capable of storing application software utilized by RFID reader 200 and/or tag data captured by RFID reader 200 during operation.

Power supply 214 may be a disposable or rechargeable battery, a set of batteries, or a battery pack that is rated to provide the necessary voltage and energy to support the operation of RFID reader 200. Alternatively or additionally, power supply 214 may receive power from an external source such as an ordinary AC outlet. Power supply 214 may be regulated in an appropriate manner to facilitate operation of RFID reader 200 in the near-field mode or the far-field mode as desired.

One exemplary embodiment of RFID reader 200 includes a mode-switch sensor architecture, which can be coupled to RFID radio module 202. The mode-switch sensor architecture detects one or more conditions indicative of near-field interrogation, and such detection prompts RFID reader 200 to automatically reconfigure RFID radio module 202 (and, in some embodiments, the antenna arrangement) for operation in the near-field interrogation mode. Depending upon the implementation of RFID reader 200, the mode-switch sensor architecture may be designed to detect one or more of the following conditions, without limitation: RF characteristics of signals received by RFID reader 200; physical or mechanical phenomena associated with the handling, movement, or manipulation of RFID reader 200; optically or visually distinguishable features or objects within the field of view of optical sensors 218; or the like. For the illustrated embodiment, the mode-switch architecture may include, incorporate, or be realized as: accelerometer 216; optical sensors 218; human-machine interface elements 206; processor 208; and/or RF analyzer 220.

In certain embodiments, the mode-switch sensor architecture incorporates or utilizes RF analyzer 220. In practice, RF analyzer 220 analyzes one or more RF signal characteristics of wireless signals transmitted and/or received by RFID reader 200. These RF signal characteristics may include, without limitation: power; received signal strength; a standing wave ratio such as VSWR or return loss; attenuation; antenna gain; and impedance. For the exemplary embodiment described here, RF analyzer 200 analyzes the RF characteristics to determine whether or not RFID reader 200 is within close physical proximity to an object. In this regard, RF analyzer 220 presumes that the user intends to perform a near-field interrogation of an object that is close to RFID reader 200. Accordingly, if the RF characteristics meet certain criteria or satisfy certain threshold values, then RF analyzer 220 will prompt RFID radio module 202 to switch into the near-field interrogation mode. For example, if RF analyzer 220 analyzes VSWR measurements, and it detects a VSWR measurement that exceeds a threshold value, then RFID reader 200 will automatically configure RFID radio module 202 for operation in the near-field mode.

In some embodiments, the mode-switch sensor architecture incorporates or utilizes accelerometer 216, which is positioned and calibrated to detect physical contact between a component of RFID reader 200 and an RFID tag. For this embodiment, detection of such physical contact is presumed to be an indicator that the user has brought RFID reader 200 into contact with an RFID tag or a tagged item, and that the user desires to read that particular RFID tag. As schematically depicted in FIG. 2, accelerometer 216 may be physically coupled to antenna element 204, it may be contained within the main housing of RFID reader 200, or it may be contained within a housing or package of the antenna arrangement. More specifically, accelerometer 216 can be configured and calibrated to detect physical contact between antenna element 204 and the desired RFID tag, between antenna element 204 and a tagged item, between the antenna arrangement and the desired RFID tag, and/or between the antenna arrangement and a tagged item.

In yet another embodiment, the mode-switch sensor architecture incorporates or utilizes at least one optical sensor 218 in conjunction with a suitably configured image processor (which may be realized with processor 208). In this embodiment, one or more optical sensors, such as the type commonly used with bar code readers, can capture image data within an interrogation or image field of RFID reader 200. The image data can be processed by the image processor in an appropriate manner to determine whether or not RFID reader 200 is within close proximity to an object, such as a tagged item. Accordingly, RFID reader 200 can automatically configure RFID radio module 202 for operation in the near-field interrogation mode when the image processor detects an object in the designated interrogation field, and when that object is within close proximity to RFID reader 200. For example, the image processor could perform a fast Fourier transform (FFT) on the image data, analyze spatial frequencies, and respond if the detected object appears out of focus (which indicates that the object is too close to RFID reader 200 for crisp image resolution). Thus, RFID radio module 202 configures itself for operation in the near-field mode when the image processor detects an object in the interrogation field that is out of focus.

Figure 3:
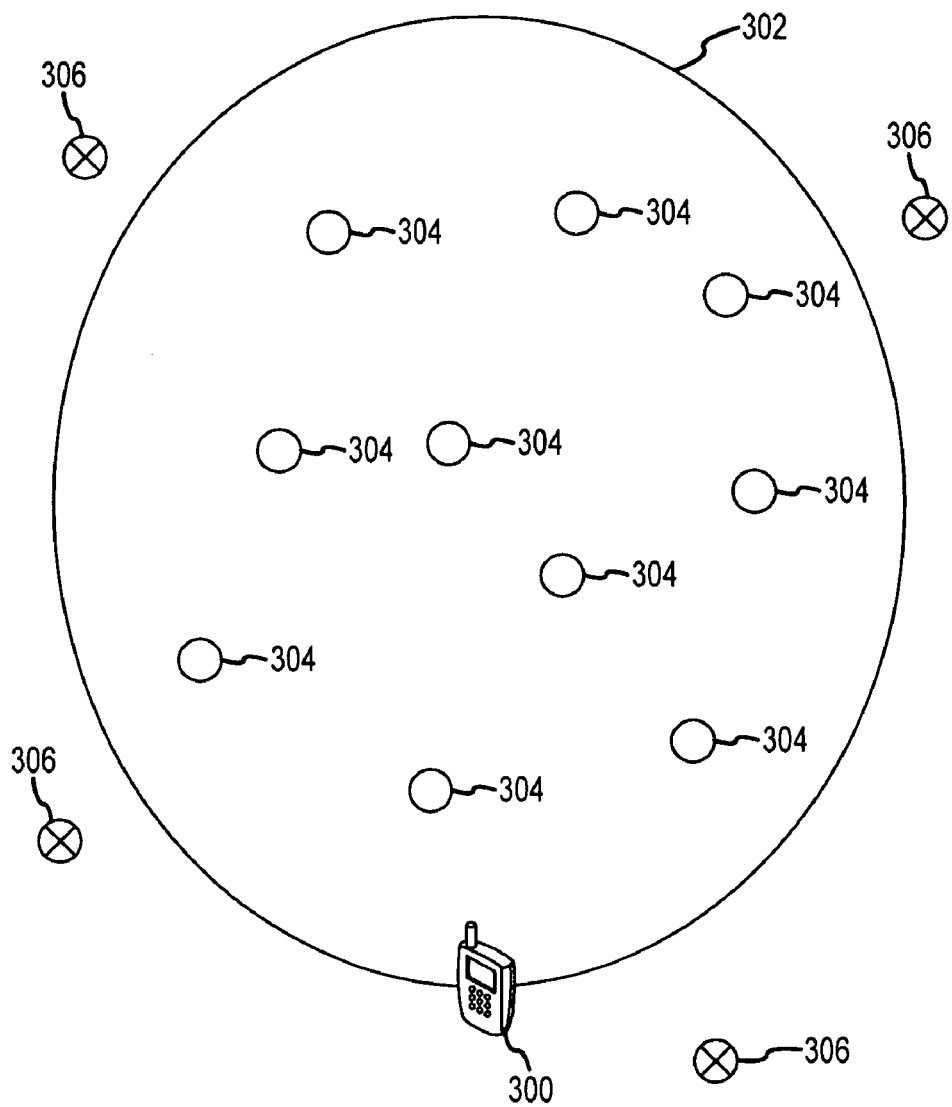
FIG. 3 is a diagram that depicts a mobile RFID reader operating in a far-field interrogation mode.
Figure 4:
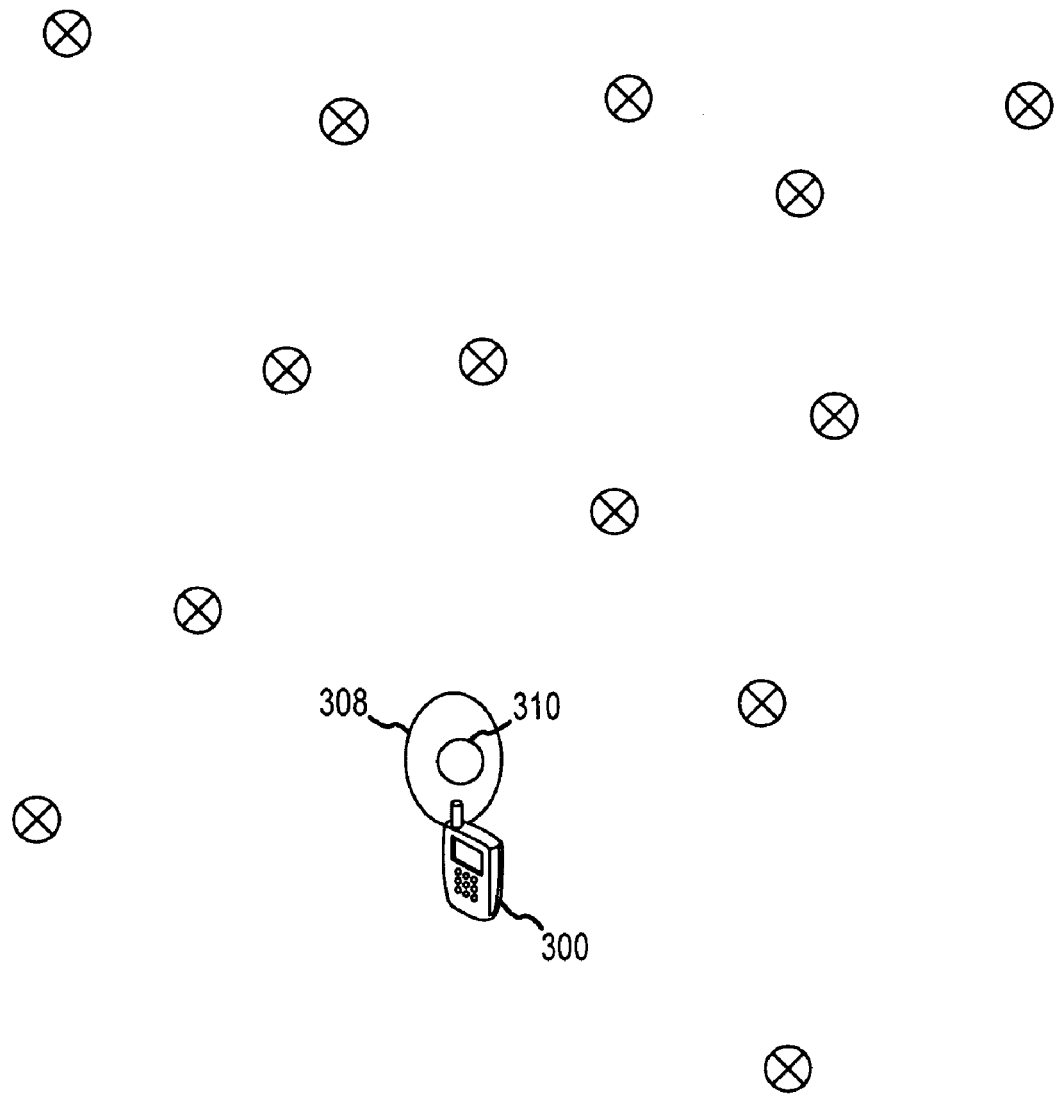
FIG. 4 is a diagram that depicts a mobile RFID reader operating in a near-field interrogation mode.

FIG. 3 is a diagram that depicts a mobile RFID reader 300 operating in a far-field interrogation mode, and FIG. 4 is a diagram that depicts RFID reader 300 operating in a near-field interrogation mode. As shown in FIG. 3, the interrogation range 302 is relatively expansive for the far-field mode, due to a relatively high interrogation transmit power setting (and/or a relatively high receiver sensitivity or gain). In practice, interrogation range 302 could extend beyond twenty to thirty feet depending on the RF environment, antenna gain, and tag quality. In this example, the interrogation range 302 encompasses ten RFID tags 304, while four RFID tags 306 remain outside the far-field interrogation range 302. In contrast, the near-field interrogation range 308 depicted in FIG. 4 is relatively small, due to a comparatively low interrogation transmit power setting (and/or a comparatively low receiver sensitivity or gain). Indeed, interrogation range 308 could be reduced to less than one foot and, in some embodiments, less than six inches. The scenario depicted in FIG. 4 represents the desired effect of near-field interrogation, i.e., all but one RFID tag 310 is outside the near-field interrogation range 308. Accordingly, the user of RFID reader 300 can selectively and individually read the tag data for RFID tag 310 with high confidence that other RFID tags will not be interfering.

The near-field interrogation mode can be achieved in a number of different ways. For example, the transmit (interrogation) power of the RFID reader can be reduced by an appropriate amount to reduce its range. As another example, the RF output of the RFID reader could be switched to an integrated near-field antenna that has RF characteristics that result in a limited interrogation range (relative to a far-field antenna). As yet another example, the RFID radio module of the RFID reader could insert additional RF attenuation into the RF receive path such that the RFID reader effectively reads tags within the near-field range. It should be appreciated that other techniques and methodologies can be utilized to change the interrogation mode of the RFID reader.

Figure 5:
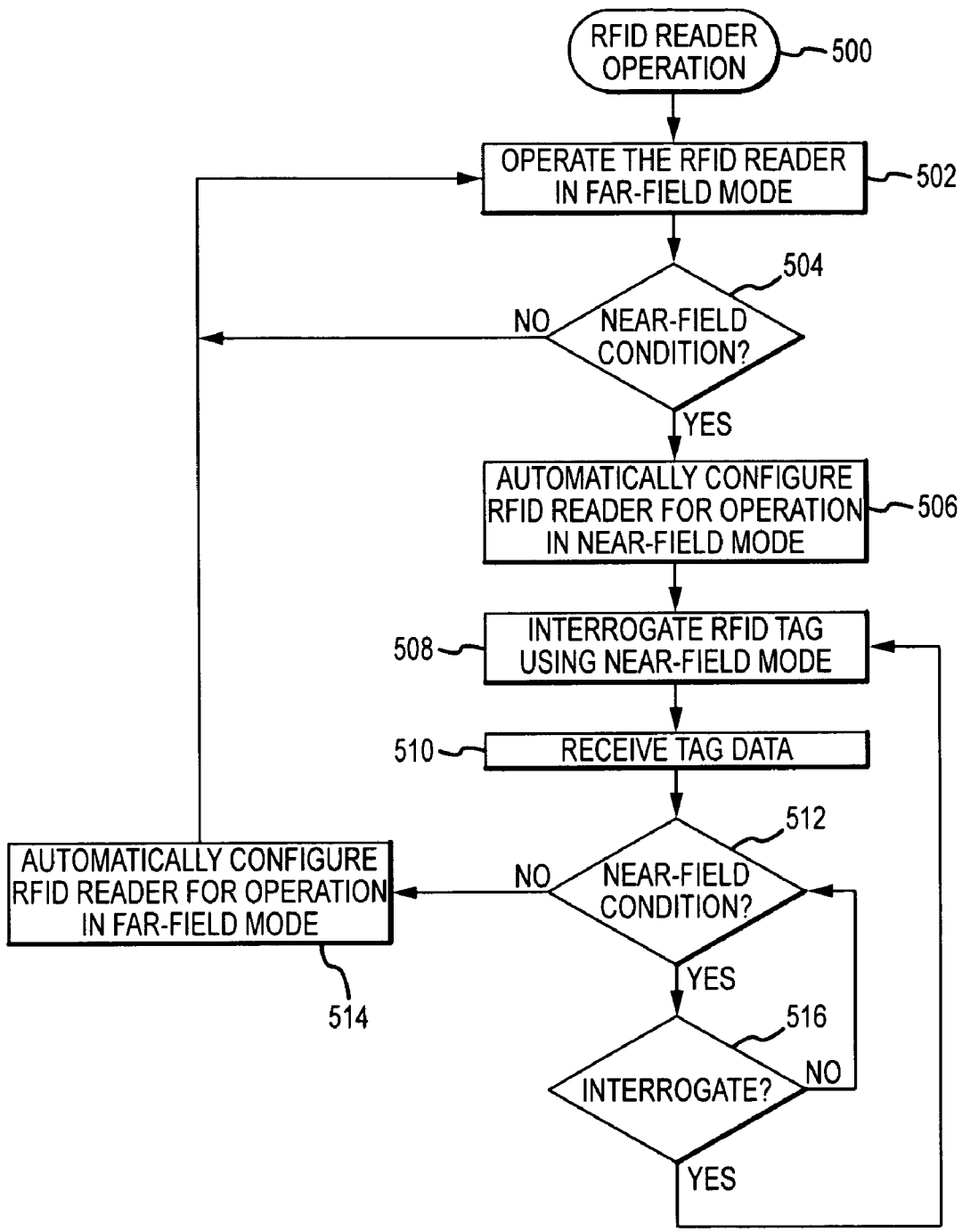
FIG. 5 is a flow chart that illustrates one exemplary embodiment of a process associated with the operation of an RFID reader.

An RFID reader having the features and functions described above can be utilized to interrogate RFID tags in either a far-field mode or a near-field mode, and the RFID reader can quickly, easily, and automatically switch between the two modes as needed. In this regard, FIG. 5 is a flow chart that illustrates an exemplary process 500 associated with the operation of an RFID reader. The various tasks performed in connection with process 500 may be performed by software, hardware, firmware, or any combination thereof. For illustrative purposes, the following description of process 500 may refer to elements mentioned above in connection with FIGS. 1-4. In practice, portions of process 500 may be performed by different elements of the described system, e.g., the processor, the RFID radio module, a sensor, etc. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

Although not a requirement, process 500 begins by operating the RFID reader in the far-field mode (task 502). Alternatively, the RFID reader may be maintained in a standby or idle mode that does not actually correspond to either the far-field or the near-field mode. For this example, it is assumed that the far-field interrogation mode is the default or normal operating mode for the RFID reader. Accordingly, process 500 may check for the presence, occurrence, or appearance of one or more detectable conditions (query task 504) that are indicative of near-field interrogation and/or indicative of a need or desire to perform near-field interrogation. If such conditions have not been detected, then process 500 may exit or return to task 502. If one or more conditions related to near-field interrogation are detected, then process can proceed to task 506 such that the RFID reader can automatically transition to the near-field mode.

In connection with query task 504, the RFID reader could support one or more different means for detecting the condition(s) that cause the RFID reader to switch to the near-field mode. Some of these detection techniques, schemes, and procedures were described above with reference to RFID reader 200. For example, query task 504 may be executed by measuring one or more RF characteristics of signals received by the RFID reader, analyzing or processing those RF characteristics, and indicating the presence, occurrence, or satisfaction of the specified condition(s) when the RF characteristics satisfy predetermined criteria. For such implementations, the RF characteristics may be associated with diagnostic signals, test signals, mode determination signals, interrogation signals, or other wireless signals generated by the RFID reader. Indeed, query task 504 may be performed in response to an interrogation trigger or request, since the delay associated with the automatic changing of modes in a practical deployment will be unnoticeable. Alternatively, query task 504 may be performed as a background task that executes independently from any user-initiated interrogation command. In one preferred embodiment, query task 504 measures the VSWR associated with interrogation signals generated by the RFID reader and initiates the change to the near-field mode if the measured VSWR is greater than a specified threshold value.

Alternatively (or additionally), the RFID reader may be equipped with an accelerometer, gyro, or motion sensor that enables query task 504 to detect or sense physical contact between a component or portion of the RFID reader and an RFID tag (or a tagged item). In other words, query task 504 can detect the force, shock, vibration, or impact that results when the RFID reader is placed into contact with another object such as an RFID tag. This detection scheme is based on the assumption that a near-field interrogation is desired whenever the intended portion of the RFID reader touches an object.

Alternatively (or additionally), the RFID reader may be equipped with an optical sensor, a camera (still or video), or other image capturing device. In such an embodiment, query task 504 could be associated with the capturing of image data within an interrogation field of the RFID reader, and the processing of such image data. Image processing techniques and technologies can be leveraged to determine when the image data conveys an object in the interrogation field that is within close proximity to the RFID reader. For example, if the image data indicates the presence of an object within a specified distance (e.g., six inches) of the RFID reader, then query task 504 will confirm that the near-field conditions have been met. As another example, if the image data is associated with an object that is out of focus (i.e., the object is too close to the image capturing device), then query task 504 will confirm that the near-field conditions have been satisfied.

Regardless of the manner in which query task 504 detects the near-field interrogation condition(s), process 500 will automatically configure the RFID reader for operation in the near-field mode in response to the detection of such conditions (task 506). In this context, automatic configuration means that the RFID reader transitions to the near-field interrogation mode without any additional user input, feedback, or manipulation of the RFID reader. Therefore, from the user perspective, the RFID reader intelligently switches to the near-field interrogation mode by itself.

Some embodiments of the RFID reader are designed to provide an audible or visual confirmation upon activation of the near-field mode. After switching to the near-field mode, the RFID reader can interrogate the RFID tag using the near-field mode (task 508), receive the tag data (task 510), and process the tag data in an appropriate manner. As mentioned previously, it may be desirable to use the near-field mode to interrogate only one RFID tag at a time. Accordingly, the RFID reader could be suitably configured to generate an audible or visual warning or error indication if multiple tags are read during a single interrogation cycle. Such a warning or error informs the user that further isolation or reduction in the interrogation range may be needed during the read operation.

The RFID reader may stay in the near-field interrogation mode indefinitely (until switched back to the far-field mode by the user) or for a predetermined period of time. Alternatively, the RFID reader can automatically reconfigure itself for operation in the far-field mode after successfully interrogating the RFID tag. Of course, other mode-switching techniques could be supported by the RFID reader. For example, this particular embodiment of process 500 assumes that the RFID reader remains in the near-field mode until the near-field condition(s) are no longer satisfied. Thus, if a near-field condition is no longer detected (query task 512), then process 500 will automatically configure the RFID reader for operation in the far-field mode (task 514). Thereafter, process 500 may exit or return to task 502. On the other hand, if one or more near-field conditions are still detected, then process 500 may check for the next interrogation command or request (query task 516). If an interrogation command is received while the RFID reader is still in the near-field mode, then process 500 will return to task 508 and proceed as described above.

Figure 6:
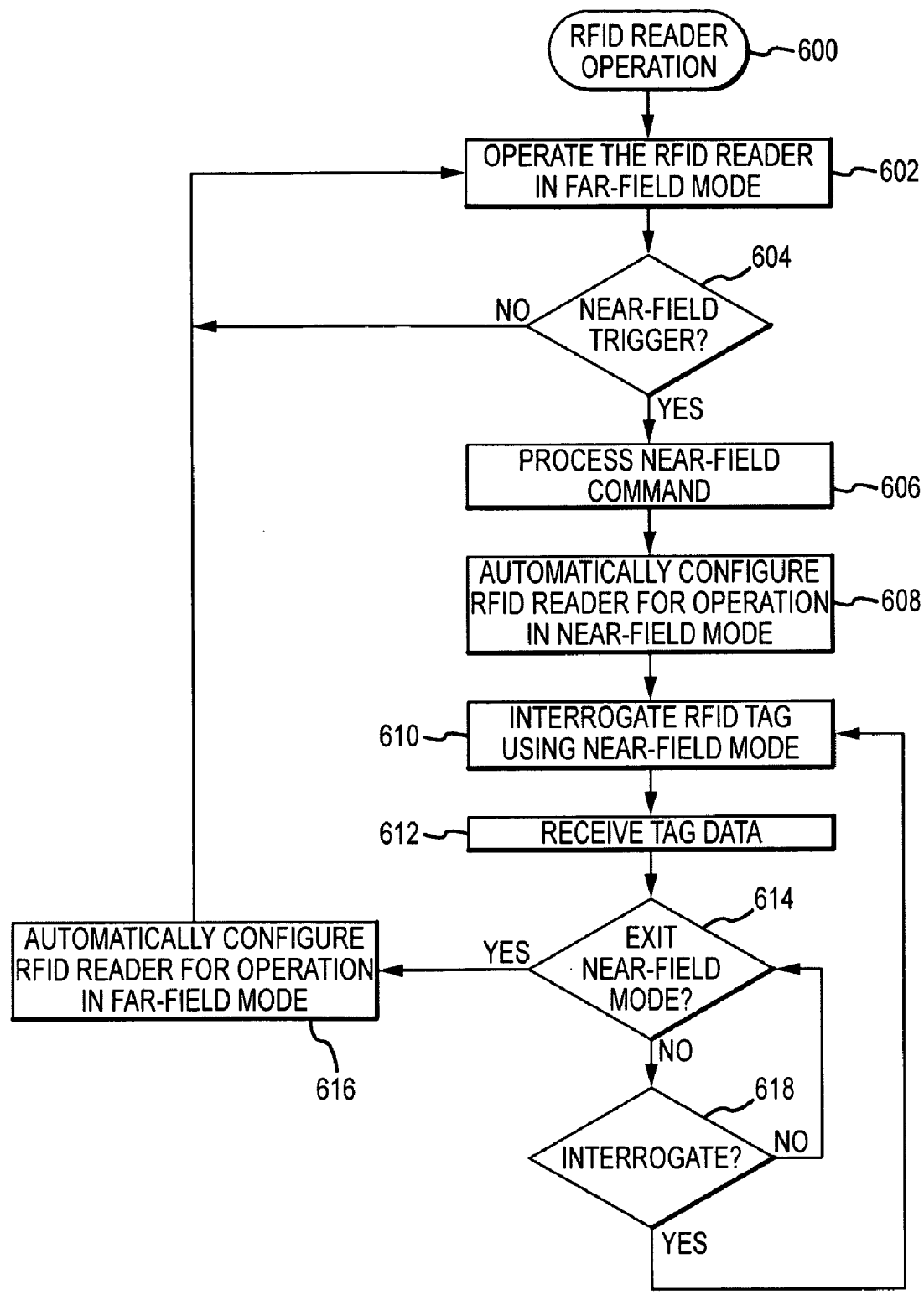
FIG. 6 is a flow chart that illustrates another exemplary embodiment of a process associated with the operation of an RFID reader.

An RFID reader need not operate in accordance with process 500, and alternative routines can be executed for purposes of switching interrogation modes. In this regard, FIG. 6 is a flow chart that illustrates another exemplary embodiment of a process 600 associated with the operation of an RFID reader. The various tasks performed in connection with process 600 may be performed by software, hardware, firmware, or any combination thereof. For illustrative purposes, the following description of process 600 may refer to elements mentioned above in connection with FIGS. 1-4. In practice, portions of process 600 may be performed by different elements of the described system, e.g., the processor, the RFID radio module, a sensor, etc. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein.

Although not a requirement, process 600 begins by operating the RFID reader in the far-field mode (task 602). Alternatively, the RFID reader may be maintained in a standby or idle mode that does not actually correspond to either the far-field or the near-field mode. For this example, it is assumed that the far-field interrogation mode is the default or normal operating mode for the RFID reader, and that the RFID reader switches to the near-field interrogation mode in response to some form of user-initiated command or request. Accordingly, process 600 may check for a user-initiated interrogation trigger (query task 604). As mentioned above in the descriptions of RFID readers 100 and 200, a user-initiated interrogation trigger may be associated with the manipulation of a human-machine interface element of the RFID reader. For example, the user could initiate the near-field mode by engaging a trigger mechanism, flipping a switch, pressing a physical button, activating a graphically displayed soft button, moving a lever or a slider, vocalizing a recognizable voice command, manipulating a touch screen or a touchpad, manipulating a keyboard or a keypad, activating an optical or image sensor, moving a graphical pointing device, or activating a motion sensor. If query task 604 does not detect a valid near-field trigger, then process 600 may exit or return to task 602. If an appropriate near-field trigger is detected, then process can proceed to task 606 such that the RFID reader can automatically transition to the near-field mode.

In response to the user-initiated interrogation trigger, the RFID reader can process or execute an appropriate command (task 606) that causes the RFID reader to enter the near-field mode. Notably, process 600 will automatically configure the RFID reader for operation in the near-field mode in response to the user-initiated interrogation trigger (task 608). Some embodiments of the RFID reader are designed to provide an audible or visual confirmation upon activation of the near-field mode. After switching to the near-field mode, the RFID reader can interrogate the RFID tag using the near-field mode (task 610), receive the tag data (task 612), and process the tag data in an appropriate manner.

The RFID reader may stay in the near-field interrogation mode indefinitely (until switched back to the far-field mode by the user) or for a predetermined period of time. For example, the RFID reader might exit the near-field mode immediately after interrogating the RFID tag, or immediately after receiving the tag data. As another example, the RFID reader could exit the near-field mode after a predetermined time period that is measured from the user-initiated interrogation trigger or measured from the time when the RFID reader is switched into the near-field mode. Of course, other mode-switching techniques could be supported by the RFID reader. If the near-field mode is to be exited (query task 614), then process 600 will automatically configure the RFID reader for operation in the far-field mode (task 616). Thereafter, process 600 may exit or return to task 602. On the other hand, if the near-field mode is to be maintained, then process 600 may check for the next interrogation command or request (query task 618). If an interrogation command is received while the RFID reader is still in the near-field mode, then process 600 will return to task 610 and proceed as described previously.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a mobile RFID reader that operates in a far-field mode for concurrently interrogating a plurality of RFID tags and in a near-field mode for individually interrogating one RFID tag at a time, the method comprising:
   capturing image data, with an optical sensor, of an object within an interrogation field of the mobile RFID reader;
   processing the image data to detect whether the object is out of focus;
   determining that the object is within close proximity to the mobile RFID reader when the image data indicates that the object is out of focus;
   automatically configuring the mobile RFID reader for operation in the near-field mode when the image data indicates that the object is out of focus; and
   thereafter, interrogating an RFID tag while the mobile RFID reader is in the near-field mode.

2. The method of claim 1, further comprising automatically configuring the mobile RFID reader for operation in the far-field mode after successfully interrogating the RFID tag.

3. A dual-mode RFID reader comprising:
   an RFID radio module configured to support a far-field interrogation mode and a near-field interrogation mode;
   an antenna arrangement coupled to the RFID radio module and configured to support the far-field interrogation mode and the near-field interrogation mode; and
   a mode-switch sensor architecture coupled to the RFID radio module and configured to detect conditions indicative of near-field interrogation; wherein:
   the RFID radio module automatically configures itself for operation in the near-field interrogation mode upon detection of the conditions;
   the mode-switch sensor architecture comprises an optical sensor configured to capture image data of an object within an interrogation field of the dual-mode RFID reader, and comprises an image processor that analyzes the image data; and
   the RFID radio module automatically configures itself for operation in the near-field interrogation mode when the image processor detects that the object is out of focus and within close proximity to the dual-mode RFID reader.

* * * * *

UNITED STATES PATENT AND TRADEMARK OFFICE
CERTIFICATE OF CORRECTION

| | |
|---|---|
| PATENT NO. | : 8,305,192 B2 |
| APPLICATION NO. | : 12/275892 |
| DATED | : November 6, 2012 |
| INVENTOR(S) | : Connolly et al. |

Page 1 of 1

It is certified that error appears in the above-identified patent and that said Letters Patent is hereby corrected as shown below:

In the Specification:

In Column 5, Line 33, delete "analyzer 200" and insert -- analyzer 220 --, therefor.

Signed and Sealed this
Thirtieth Day of April, 2013

Teresa Stanek Rea
*Acting Director of the United States Patent and Trademark Office*